(12) United States Patent
Chiarandini

(10) Patent No.: US 12,432,420 B2
(45) Date of Patent: Sep. 30, 2025

(54) CONTENT SHARING PLATFORM CHANNEL REVIEW USING A VIRTUAL ASSISTANT

(71) Applicant: Google LLC, Mountain View, CA (US)

(72) Inventor: Luca Chiarandini, San Francisco, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 18/414,356

(22) Filed: Jan. 16, 2024

(65) Prior Publication Data

US 2025/0234070 A1     Jul. 17, 2025

(51) Int. Cl.
*H04N 21/475* (2011.01)
*H04N 21/431* (2011.01)
*H04N 21/466* (2011.01)
*H04N 21/84* (2011.01)

(52) U.S. Cl.
CPC ....... *H04N 21/4756* (2013.01); *H04N 21/431* (2013.01); *H04N 21/4667* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 10,540,699 B1* | 1/2020 | Prabhu | H04N 5/907 |
| 11,662,970 B2* | 5/2023 | Ashkenazi | H04L 65/4015 |
| | | | 709/205 |
| 12,165,179 B2* | 12/2024 | Chopra | G06Q 30/0282 |
| 2014/0130099 A1* | 5/2014 | Kunisetty | H04N 21/475 |
| | | | 725/50 |
| 2018/0300774 A1* | 10/2018 | Ghoshal | G06Q 30/0282 |
| 2023/0274654 A1* | 8/2023 | Yadkikar | G06T 11/00 |
| 2023/0289377 A1* | 9/2023 | Chopra | G06T 11/206 |
| 2023/0342813 A1* | 10/2023 | Miller | G06Q 30/0278 |
| 2024/0005415 A1* | 1/2024 | Gray | G06Q 50/01 |
| 2024/0273793 A1* | 8/2024 | DeCharms | G09B 5/06 |

\* cited by examiner

*Primary Examiner* — James R Marandi
(74) *Attorney, Agent, or Firm* — Lowenstein Sandler LLP

(57) ABSTRACT

A channel review user interface (UI) identifies a channel of a content sharing platform and policies used to review the channel. Through the channel review UI, a virtual assistant including an artificial intelligence (AI) model is invoked, and an indication to include external information from external source(s) is received. Information from the content sharing platform and external source(s) are provided as input to the AI model. Questions from the user are received at the channel review UI and provided as input to the AI model. Outputs from the AI model are obtained in real-time, and include responses to the input question(s) based on information obtained from the content sharing platform and external source(s). As each output is obtained from the AI model, the channel review UI is modified to present the response to the user.

20 Claims, 7 Drawing Sheets

US 12,432,420 B2

CONTENT SHARING PLATFORM CHANNEL REVIEW USING A VIRTUAL ASSISTANT

TECHNICAL FIELD

Aspects and implementations of the present disclosure relate to a content sharing platform channel review using a virtual assistant.

BACKGROUND

A platform can have policies that apply to channels of the platform and content items of channels. Channels can be reviewed, in part, by human reviewers to determine whether the channel is compliant with the platform policies. However, the human review portion of the channel review process can be tedious for human reviewers and take a long time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method including: providing a channel review user interface (UI) for presentation on a client device of a channel reviewing user, the channel review UI identifying a channel of a content sharing platform and one or more policies to be used in a review of the channel, the channel including one or more video items; receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant includes a generative artificial intelligence (AI) model; providing, to the virtual assistant, content sharing platform information pertaining to the channel and the indication to activate the external source option as first input to the generative AI model; receiving, via the channel review UI, a plurality of questions of the channel reviewing user about content of the channel; providing, to the virtual assistant, the plurality of questions of the channel reviewing user as a set of second inputs to the generative AI model; obtaining, from the virtual assistant, a plurality of outputs of the generative AI model in real-time, wherein the plurality of outputs includes responses to the plurality of questions of the channel reviewing user, the responses being based on the content sharing platform information about the channel and the external information from the plurality of external sources; and as each of the plurality of outputs is obtained from the virtual assistant, causing the channel review UI to be modified to present a respective response to the channel reviewing user.

In some aspects, one or more questions of the plurality of questions of the channel reviewing user pertain to content of the one or more video items. Responses to the one or more questions are based on external information obtained from the plurality of external sources.

In some aspects, one or more questions of the plurality of questions of the channel reviewing user pertain to a reputation of the channel. Responses to the one or more questions are based on external information obtained from the plurality of external sources.

In some aspects, responses to the plurality of questions indicate whether the channel is compliant with the one or more policies.

In some aspects, the channel review UI includes a virtual assistant panel for communications between the channel reviewing user and the virtual assistant.

In some aspects, prior to receiving, via the channel review UI, a first question of the channel reviewing user pertaining to content of the channel, the virtual assistant panel displays a summary of information obtained about the channel, the summary based on the content sharing platform information about the channel and the external information from the plurality of external sources.

In some aspects, the plurality of outputs further comprises one or more channel labels corresponding to the plurality of questions of the channel reviewing user, the one or more channel labels being based on the content sharing platform information pertaining to the channel and the external information from the plurality of external sources.

In some aspects, the one or more channel labels indicate whether the channel is compliant with one or more policies.

In some aspects the method further includes: providing, to the virtual assistant, responses to the plurality of questions of the channel reviewing user as a set of inputs to a second AI model; and obtaining, from the virtual assistant, a second plurality of outputs of the second AI model in real-time, wherein the second plurality of outputs include channel labels corresponding to the plurality of questions of the channel reviewing user, the channel labels being based on the content sharing platform information pertaining to the channel and the external information from the plurality of external sources In some aspects, the method further includes: as each of the second plurality of outputs is obtained from the virtual assistant, causing the channel review UI to be modified to present a second respective response to the channel reviewing user, the second respective response indicating a respective channel label and requesting a confirmation that the respective channel label corresponds to the channel of the content sharing platform.

In some aspects, the method further includes: receiving a confirmation indication that the respective channel label corresponds to the channel of the content sharing platform; and assigning the respective channel label to the channel of the content sharing platform by storing, in a data structure, an indication that the respective channel label corresponds to the channel of the content sharing platform.

In some aspects, the method further includes: causing the channel review UI to be modified to indicate the respective channel label has been assigned to the channel of the content sharing platform.

In some aspects, the content sharing platform information is obtained based on metadata associated with the channel and one or more transcripts of the one or more video items.

In some aspects, the method further includes: providing, to the virtual assistant, the responses to the plurality of questions of the channel reviewing user as a set of third inputs to the generative AI model; providing, to the virtual assistant, a second plurality of questions of the channel reviewing user as a set of fourth inputs to the generative AI model; obtaining, from the virtual assistant, a second plurality of outputs of the generative AI model in real-time, wherein the second plurality of outputs comprises second responses to the second plurality of questions of the channel reviewing user, the second responses being based on the content sharing platform information about the channel and the external information from the plurality of external sources; and as each of the second plurality of outputs is obtained from the virtual assistant, causing the channel review UI to be modified to present a second respective response to the channel reviewing user.

In some aspects, training data for further training of the generative AI model is selected from the plurality of questions of the channel reviewing user and responses to the plurality of questions of the channel reviewing user.

In some aspects, metadata associated with the channel comprises at least one of a channel title, a channel description, a channel source, a channel viewership statistic, a video item title, a video item description, a video item duration, a video item publication status, or a video item viewership statistic.

An aspect of the disclosure provides a system, the system including: a memory; and a processor communicatively coupled to the memory, the processor to perform operations comprising: providing a channel review user interface (UI) for presentation on a client device of a channel reviewing user, the channel review UI identifying a channel of a content sharing platform and one or more policies to be used in a review of the channel, the channel comprising one or more video items; receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant comprises a generative artificial intelligence (AI) model; providing, to the virtual assistant, content sharing platform information pertaining to the channel and the indication to activate the external source option as first input to the generative AI model; receiving, via the channel review UI, a plurality of questions of the channel reviewing user about content of the channel; providing, to the virtual assistant, the plurality of questions of the channel reviewing user as a set of second inputs to the generative AI model; obtaining, from the virtual assistant, a plurality of outputs of the generative AI model in real-time, wherein the plurality of outputs comprises responses to the plurality of questions of the channel reviewing user, the responses being based on the content sharing platform information about the channel and the external information from the plurality of external sources, the responses indicating whether the channel is compliant with the one or more policies; and as each of the plurality of outputs is obtained from the virtual assistant, causing the channel review UI to be modified to present a respective response to the channel reviewing user.

In some aspects, the one or more first questions of the plurality of questions of the channel reviewing user pertain to content of the one or more video items, and one or more second questions of the plurality of questions of the channel reviewing user pertain to a reputation of the channel, wherein responses to the one or more first questions and the one or more second questions are based on external information obtained from the plurality of external sources.

In some aspects, the channel review UI comprises a virtual assistant panel for communications between the channel reviewing user and the virtual assistant.

An aspect of the disclosure provides a non-transitory computer readable storage medium comprising instructions for a server that, when executed by a processing device, cause the processing device to perform operations comprising: providing a channel review user interface (UI) for presentation on a client device of a channel reviewing user, the channel review UI identifying a channel of a content sharing platform and one or more policies to be used in a review of the channel, the channel comprising one or more video items; receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant comprises a generative artificial intelligence (AI) model; providing, to the virtual assistant, content sharing platform information pertaining to the channel and the indication to activate the external source option as first input to the generative AI model; receiving, via the channel review UI, a plurality of questions of the channel reviewing user about content of the channel; providing, to the virtual assistant, the plurality of questions of the channel reviewing user as a set of second inputs to the generative AI model; obtaining, from the virtual assistant, a plurality of outputs of the generative AI model in real-time, wherein the plurality of outputs comprises responses to the plurality of questions of the channel reviewing user, the responses being based on the content sharing platform information about the channel and the external information from the plurality of external sources; and as each of the plurality of outputs is obtained from the virtual assistant, causing the channel review UI to be modified to present a respective response to the channel reviewing user.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
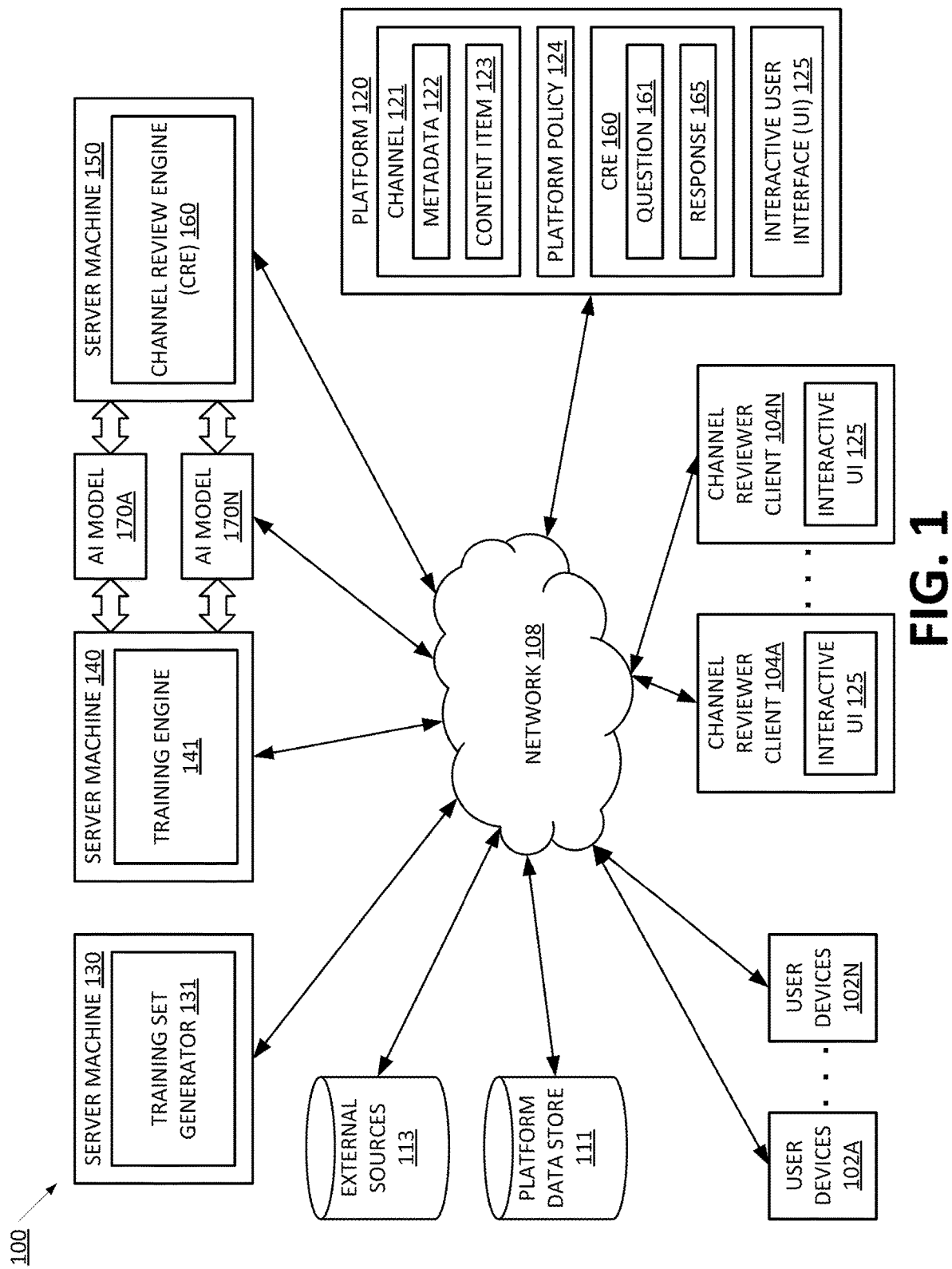
FIG. 1 illustrates an example system architecture, in accordance with implementations of the present disclosure.

Aspects of the present disclosure relate to content sharing platform channel review using a virtual assistant.

Human content reviewers (e.g., channel reviewing users) can participate in a channel review process to determine whether a channel of a content sharing platform complies with policies of the content sharing platform. Policies of the content sharing platform can apply to channels of the content sharing platform, as well as a content item (e.g., a video) of the channel. For example, policies can be used to regulate the quality of content shared on the platform, or support laws and regulations regarding content distribution (e.g., copyright laws).

During a channel review process (e.g., in a channel review session), channel reviewing users can gather information about (i) the channel, (ii) content items of the channel, and (iii) a channel owner, in order to determine channel characteristics (labels) for the channel review process. Information gathered by channel reviewing users can include, for example, metadata of the channel's content items such as videos including, for example, video transcripts, video titles, video lengths; the channel's metadata including, for example, channel title, channel description, channel age appropriateness, quantity of videos, etc.; and/or other background information about the channel or channel owner. Channel labels that are determined by the channel reviewing user can be provided to a channel review system. The channel review system can use a channel reviewing algorithm to make a final determination as to whether the channel complies with a respective policy of the content sharing platform. The channel labels can be entered by the channel reviewing user as a free form input, or be selected from a prepopulated list. For example, a channel reviewing user that is evaluating a channel with content written for children might select a channel label, "Kids" from a prepopulated list of channel labels.

Generally, the quality of content items uploaded to the content sharing platform can increase when content sharing platform policies are applied to more channels and content items. However, the conventional channel review process requires many hours of manual work, and therefore is cost prohibitive. As a result, typically only a small subset of channels and content items is reviewed by channel reviewing users. For example, a channel reviewing user might review a channel that has been flagged for violating one of the content sharing platform policies. In another example, a channel owner (e.g., user uploading content items to the channel) might request that their channel be reviewed to gain access to additional content platform privileges (e.g., channel/content item monetization). In another example, a channel might be reviewed for other verification purposes, based on indications of misuse, fraud, or other illegal activity. In some cases, a channel can be reviewed or re-reviewed periodically or semi-regularly.

When doing the review, it can be challenging and time consuming for the channel reviewing user to parse through all information about a channel available on the content sharing platform. To determine channel labels for the channel, the channel reviewing user can look holistically at multiple datapoints (e.g., channel information) associated with the channel owner, the channel, and/or respective content items published to the channel. The quality of the channel evaluation performed by the channel reviewing user (e.g., the quality of the generated channel labels) can be based on the amount of time the channel reviewing user spends gathering and reviewing channel information, as well as the completeness and accuracy of the channel information. In some implementations, channel information gathered from the content sharing platform can be insufficient for a channel reviewing user to select accurate channel labels for the channel. For example, if a malicious actor has taken control of a channel, it might not be possible to determine the malicious actor is not the original channel owner using information only obtained from the content sharing platform. In such examples, external sources of information from third parties may need to be used to verify the contents of a channel, the content items published to the channel, and/or the reputation of the channel owner. In another example, a channel description might not provide sufficient details to understand an intent of the channel, content items published to the channel, or biographical information of the channel owner, and the reviewer might need to access external channel information to supplement information obtained from the content sharing platform. Obtaining this additional information is time consuming and requires significant amount of computing resources.

Aspects of the present disclosure address the above noted and other deficiencies by using a virtual assistant (e.g., a conversational model) to assist a human reviewer in evaluating a channel of a content sharing platform. A channel review engine (e.g., using a processing device) can provide a channel reviewing user with an interactive user interface (UI) for requesting and obtaining information needed to review a channel of the content sharing platform. The channel review UI can identify the channel being reviewed, one or more policies of the content sharing platform, information obtained about the channel from the content sharing platform, and an option to obtain external information about the channel (e.g., information about the channel from sources other than the content sharing platform). The channel review UI can include a location (e.g., a virtual assistant panel) for the channel reviewing user to invoke a virtual assistant (VA) to assist in reviewing the channel. The virtual assistant panel can include an input area for the channel reviewing user to input information, and an output area for the VA to communicate with the channel reviewing user. In some implementations, the input area can accept various forms of input and the output area can provide various forms of output. For example, the input area can accept text, images, videos, or audio, and the output area can produce text, images, videos, or audio.

The VA can include, or be based on, a generative artificial intelligence (AI) model, such as a large language model (LLM). The VA can use the generative AI model and/or additional AI or machine learning models to obtain information about the channel from the content sharing platform. If the content reviewing user has indicated in the channel review UI that external information should be considered by the VA, the VA can obtain external information from external sources (e.g., from an external platform or through an internet indexing search). Once the VA has obtained the channel information (from the content sharing platform and/or from external sources), the VA can use the generative AI model to generate an output for the user based on the channel information. For example, the VA can generate a summary of the channel information obtained from the content sharing platform and/or the external information obtained from third parties.

The VA can accept inputs (e.g., prompts) from a channel reviewing user such as questions about the channel, and can generate responses based on the questions of the channel reviewing user. The VA can use the question from the channel reviewing user as an input to the generative AI model to generate an output that reflects a response to the question. In some implementations the generative AI model can generate a response based on previously obtained platform sharing channel information and/or external channel information, depending on the channel reviewing users' selected preferences. Each time the VA obtains an output of the generative AI model, a response based on the output can be displayed to the channel reviewing user by modifying the channel review UI displayed on a client device used by the channel reviewing user. In some implementations, the output of the generative AI model can be modified before it is displayed in the interactive UI as a response to the question of the channel reviewing user.

Content reviewing users can engage in a "conversation" with a VA to determine the intent of a channel. The "intent" of a channel can be based on, for example, aspects such as the topic of the channel, the intended audience, the quality of the content items published to the channel, the origin of the channel, etc. The channel reviewing user can determine channel labels based on the intent of the channel. Channel labels can be provided to a channel review algorithm that can make a final determination as to whether the channel complies with the various policies of the content sharing platform. In some implementations, the VA can also determine and/or generate channel label suggestions for the channel reviewing user. The VA can present the channel label suggestions to the content reviewing user to confirm whether the channel labels apply to the channel.

Advantages of implementing a content sharing platform channel review using a virtual assistant include, but are not limited to, reducing the time needed to evaluate channels and determine channels' labels, thus making the review process to be easily performed for a large number of channels, which ensures that channels offered to users of the content sharing platform comply with various policies of the content sharing platform, and avoids consumption of computing and storage resources by those channels that do not comply with the above policies and are therefore requested to be removed from the content sharing platform. Additionally, the virtual assistant is able to access externally sourced information in an efficient way, which results in improved quality of outputs of the channel reviewing algorithm and in reduced consumption of computing resources. Streamlined collection of information about the channel from the content sharing platform and external sources can additionally reduce the potential for human error when generating channel labels, thus increasing the predictability of the outputs of the channel reviewing algorithm.

FIG. 1 illustrates an example of system 100, in accordance with implementations of the present disclosure. The system 100 includes user devices 102A-N, a platform data store 111, a platform 120, and/or server machines 130-150, each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, platform data store 111 can be a persistent storage capable of storing data as well as data structures to tag, organize, and index the platform data. In some implementations, a data item of platform data can correspond to one or more portions of a content item for display to a content viewer via a graphical user interface (GUI) on a viewing user device 102, in accordance with implementations described herein. A data item can correspond to metadata for a content item, such as a content item title, transcript, description, length, or content item viewing statistics. In some implementations, a data item of platform data can correspond to one or more portions of a channel, including channel metadata such as a channel title, channel description, channel uploading user, or channel viewing statistics. Platform data store 111 can be hosted by one or more storage devices, such as main memory, magnetic or optical storage based disks, tapes or hard drives, NAS, SAN, and so forth. In some implementations, platform data store 111 can be a network-attached file server, while in other implementations the platform data store 111 can be some other type of persistent storage such as an object-oriented database, a relational database, and so forth, that may be hosted by platform 120 or one or more different machines coupled to the platform 120 via network 108.

The user devices 102A-N can each include computing devices such as personal computers (PCs), laptops, mobile phones, smart phones, tablet computers, netbook computers, network-connected televisions, etc. Each user device 102 can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital content items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital content items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to user devices 102A-N by platform 120. In one example, the content viewers can be embedded media players that are embedded in web pages provided by the platform 120.

Platform 120 can include one or more channels 121. A channel 121 can include metadata 122 about the channel 121, and one or more content items 123 available from a common source, or content items 123 having a common topic, theme, or substance. Metadata 122 can include information about the channel 121, such as a title, description, date, user uploader, usage statistics, or content language. In some implementations, metadata 122 can include information about the one or more content items 123 of channel 121. For example, metadata 122 can include information about content item 123, such as a title, description, date, identity of channel owner, usage statistics, or language.

A channel 121 can represent one or more content item 123 (e.g., digital content) chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel 121 based on the owner's actions, such as the owner making digital content available on the channel 121, the owner selecting (e.g., liking) digital content associated with another channel 121, the owner commenting on digital content associated with another channel 121, etc. The activities associated with the channel 121 can be collected into an activity feed for the channel 121. Users, other than the owner of the channel 121, can subscribe to one or more channels 121 in which they are interested. The concept of "subscribing" may also be referred to as "liking," "following," "friending," and so on.

A content item 123 can be consumed via the Internet or via a mobile device application, such as a content viewer of viewing client devices 102A-N. In some implementations, a content item 123 can correspond to a media file (e.g., a video file, an audio file, a video stream, an audio stream, etc.). In other or similar implementations, a content item 123 can correspond to a portion of a media file (e.g., a portion or a chunk of a video file, an audio file, etc.). As discussed previously, a content item 123 can be requested for presentation to the user by the user of the platform 120. As used herein, "content item" can include an electronic file that can be executed or loaded using software, firmware or hardware configured to digitally present the content item to an entity. As indicated above, in at least one implementation, the platform 120 can store the content items 123, or references to the content items 123, using the platform data store 111. In some implementations, the platform 120 can store the content item 123 or fingerprints as electronic files in one or more formats using platform data store 111.

In some implementations, content item 123 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some implementations, a video item can be stored (e.g., at platform data store 111) as a video file that includes a video component and an audio component. The video component can include video data that corresponds to one or more sequential video frames of the video item. The audio component can include audio data that corresponds to the video data.

In some implementations, platform 120 and/or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a channel reviewing user with access to channel 121. For example, platform 120 can include a user-facing webpage. Platform 120 can also include back-end software that can be used to provide a channel reviewing user with access to channel 121. Platform 120 can include channel 121. Channel 121 can be made accessible through platform 120. In some implementations, platform 120 can facilitate the access of channel 121, or information about channel 121 by a channel reviewer client 104 through interactive user interface (UI) 125.

Platform 120 can include one or more platform policies 124. A platform policy 124 can include metrics or threshold values that can be used to enforce a readable version of the platform policy 124. For example, a profanity policy can include a threshold value related to the number of times profanity appears in content item 123 or channel 121. A platform policy 124 can include multiple tiers or threshold values. For example, a profanity policy can include a threshold value related to a first type of profanity and a separate threshold value related to a second type of profanity. In another example, a profanity policy can include a first threshold value and second threshold value related to the number of times profanity appears in content item 123 or channel 121.

Platform 120 can include channel review engine (CRE) 160 that allows platform 120 to determine whether a channel 121 complies with a platform policy 124. In some implementations, CRE 160 can determine whether content item 123 (independent from channel 121) complies with a platform policy 124. CRE 160 can communicate with channel reviewer client devices 104A-N.

The channel reviewer client devices 104A-N can each include computing devices such as personal computers (PCs), laptops, mobile phones, smart phones, tablet computers, netbook computers, network-connected televisions, etc. Each channel reviewer client 104 can present an interactive UI 125. The interactive UI 125 can identify a channel 121 of the platform 120 that is being reviewed, information about the channel 121 obtained from the platform 120, such as metadata 122, or portions of content item 123, one or more platform policies 124, a location for the channel reviewing user (e.g., the user of channel reviewer client 104) to invoke a virtual assistant (VA), and an option to obtain external information about the channel 121 (e.g., information about the channel from third party sources, such as from external sources 113).

In some implementations, the interactive UI 125 can be provided by CRE 160 (e.g., via a web browser) for channel reviewing users to obtain and evaluate information about a channel of platform 120. Alternatively, the interactive UI 125 can be provided by a client application, which is hosted by channel reviewer client 104A-N and communicates with CRE 160 to provide the functionality described herein. For example, CRE 160 can process a question 161 received from the channel reviewer client 104 pertaining to channel 121 or content item 123. In some implementations, CRE 160 can receive a question 161 from channel reviewer client 104 and provide the question 161 as part of an input to an AI model 170. AI model 170 can be trained to generate, based on information about channel 121 (e.g., including metadata 122), a response 165 to question 161. CRE 160 can respond to the question 161 by providing a response 165 to channel reviewer client 104 via the interactive UI 125. In some implementations, CRE 160 can obtain the response 165 from an AI model 170.

The client application or CRE 160 can include a virtual assistant (VA) that a channel reviewing user can communicate with conversationally. The VA can accept user inputs (e.g., prompts) and generate responses to user inputs based on information about the channel. In some implementations, the VA can include, or interface with the AI model 170 such as a generative AI model. Through the interactive UI 125, the VA can receive open-ended questions of the channel reviewing user and generate open-ended outputs as a response. For example, a channel reviewing user can provide the question, "Is this channel for kids?" to the VA. The VA, using an AI model 170 can generate an open-ended output such as, "Probably. This channel includes elements that are appropriate for viewing by children, such as reading lessons and sing-alongs." The VA can accept determinative question inputs (e.g., questions that have "true/false" or binary answers) and generate a determinative output as a response. For example, the VA can generate a determinative output such as, "Yes" to the question of the channel reviewing user. In some implementations, the interactive UI 125 can include options for the content reviewing user to provide feedback about the response provided by the VA. Additional details regarding the interactive UI 125 are described below with reference to FIG. 3.

Server machine 130 can include a training set generator 131 that is capable of generating training data (e.g., a set of training inputs and a set of target outputs) to train the AI models 170A-N. Training data can be associated with training an AI model 170 to generate a response 165 to a question 161 based on any combination of metadata 122, question 161, and/or external information (not shown, e.g., obtained from external sources 113). Training set generator 131 can accept responses 165 as training input data to generate a training corpus for the AI model 170. Training set generator 131 (or another component of system 100) can store the generated corpus of training data at platform data store 111. In some implementations, training set generator 131 can generate training data that can be used to refine an already trained model (e.g., AI model 170). In some implementations, training set generator 131 can generate training data that can be used to train an LLM. In some implementations, training input data can be populated with historical variations of metadata 122, questions 161, or responses 165, collected or generated for a respective historical channel. In some implementations, training set generator 131 can attach various training labels to training input data used to generate training data.

In some implementations, model training can be supervised, and each set of training data can include a subset of training inputs and target outputs based on the identified data. To train a supervised model, training set generator 131 can generate training data including a subset of training inputs and a subset of target outputs. The subset of training inputs can include questions 161, and a subset of target outputs can include responses 165. In some implementations, a subset of training inputs can include responses 165, and a subset of target outputs can include questions 161. In some implementations, training set generator 131 can include an LLM that accepts responses 165 and generates similar descriptions based on the input of the responses 165 for a particular question. In some implementations, model training can be unsupervised. To train an unsupervised model, training set generator 131 can generate training data by clustering groups of historical responses (e.g., included in platform data store 111) based on similarities between the historical responses, through dimensionality reduction by reducing the number of features in the data while retaining as much relevant information about the historical responses as possible, by generating synthetic or partially synthetic data that resembles the original data, through anomaly detection by identifying parts of content items that are significantly different from the rest of the data, or through data augmentation by applying mathematical transformations to the training dataset.

Server machine 140 may include a training engine 141. Training engine 141 can train an AI model 170A-N using the training data from training set generator 131. In some implementations, the AI model 170A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the AI model 170A-N that captures these patterns. The AI model 170A-N can be a model composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning or AI model can be trained by, for example, adjusting weights of a neural network in accordance with a backpropagation learning algorithm or the like. In other or similar implementations, the AI model 170A-N can refer to the model artifact that is created by training engine 141 using training data that includes training inputs. Training engine 141 can find patterns in the training data, identify clusters of data that correspond to the identified patterns, and provide the AI model 170A-N that captures these patterns. The AI model 170A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some implementations, training engine 141 can train the AI models 170A-N using a generative adversarial network (GAN). A GAN can consist of two neural networks, where one neural network is a generative AI model, and the other neural network is a discriminative AI model. GAN can cause each of the two neural networks to engage in a competitive process against the other neural network. The generative AI model can attempt to synthesize data that is indistinguishable from collected data (e.g., input data to the generative AI model), and the discriminative AI model can attempt to differentiate between collected data and synthesized data. GAN training can iteratively refine the output of the generative AI model to align to the collected dataset more closely. In some implementations, training engine 141 can train the AI models 170A-N using a variational auto-encoder (VAE), which can introduce probabilistic encoding to represent input data. The probabilistic encoding can be processed through one or more layers and then decoded to reconstruct a generative output. In this way, VAE can be used to train the AI models 170A-N to learn latent configurable representations of data (e.g., the probabilistic encoding through various layers). Output from the AI models 170A-N trained using VAE can be continuously reconfigured based on the latent configurable representations of data.

Server machine 150 can include channel review engine (CRE) 160 that provides information about channel 121 (e.g., metadata 122 and/or external information obtained, for example from external source 113, not illustrated), questions 161, and responses 165 to the AI models 170A-N to obtain one or more outputs. Based on the outputs of the AI model 170, CRE 160 can generate a mapping between a question 161 and a corresponding response (e.g., response 165). The CRE 160 can store generated mapping data in platform data store 111, a memory associated with a channel reviewer client 104, and/or another memory associated with system 100. In some implementations, CRE 160 can provide portions of the platform policy 124 to an AI model 170. The CRE 160 can obtain generated responses 165 from the AI models 170A-N. In some implementations, CRE 160 can use another model (e.g., AI model 170) to collect and process information about channel 121 (e.g., metadata 122, external information obtained from external sources (not illustrated), etc.).

In some implementations, CRE 160 can use the AI models 170A-N to collect and process the questions 161 provided by channel reviewing users via the interactive UI 125 of a channel reviewer client 104.

It should be noted that in some implementations, the functions of server machines 130, 140, and 150 or platform 120 may be provided by a fewer number of machines. For example, in some implementations the server machines 130 and 140 may be integrated into a single machine, while in other implementations the server machines 130, 140, and 150 may be integrated into multiple machines. In addition, in some implementations one or more of server machines 130, 140, and 150 can be integrated into platform 120. In some implementations, one or more of server machines 130, 140, and 150 can be integrated separately from platform 120.

In general, functions described in implementations as being performed by platform 120 and/or server machines 130-150 can also be performed on the channel reviewer client devices 102A-N in other implementations, if appropriate. In addition, the functionality attributed to a specific component can be performed by different or multiple components operating together. Platform 120 can also be accessed as a service provided to other systems or devices through appropriate application programming interfaces, and thus is not limited to use in websites.

In some implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of platform 120. Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a specific location of a user cannot be determined. Thus, the user can have control over what information is collected about the user, how that information is used, and what information is provided to the user.

Figure 2:
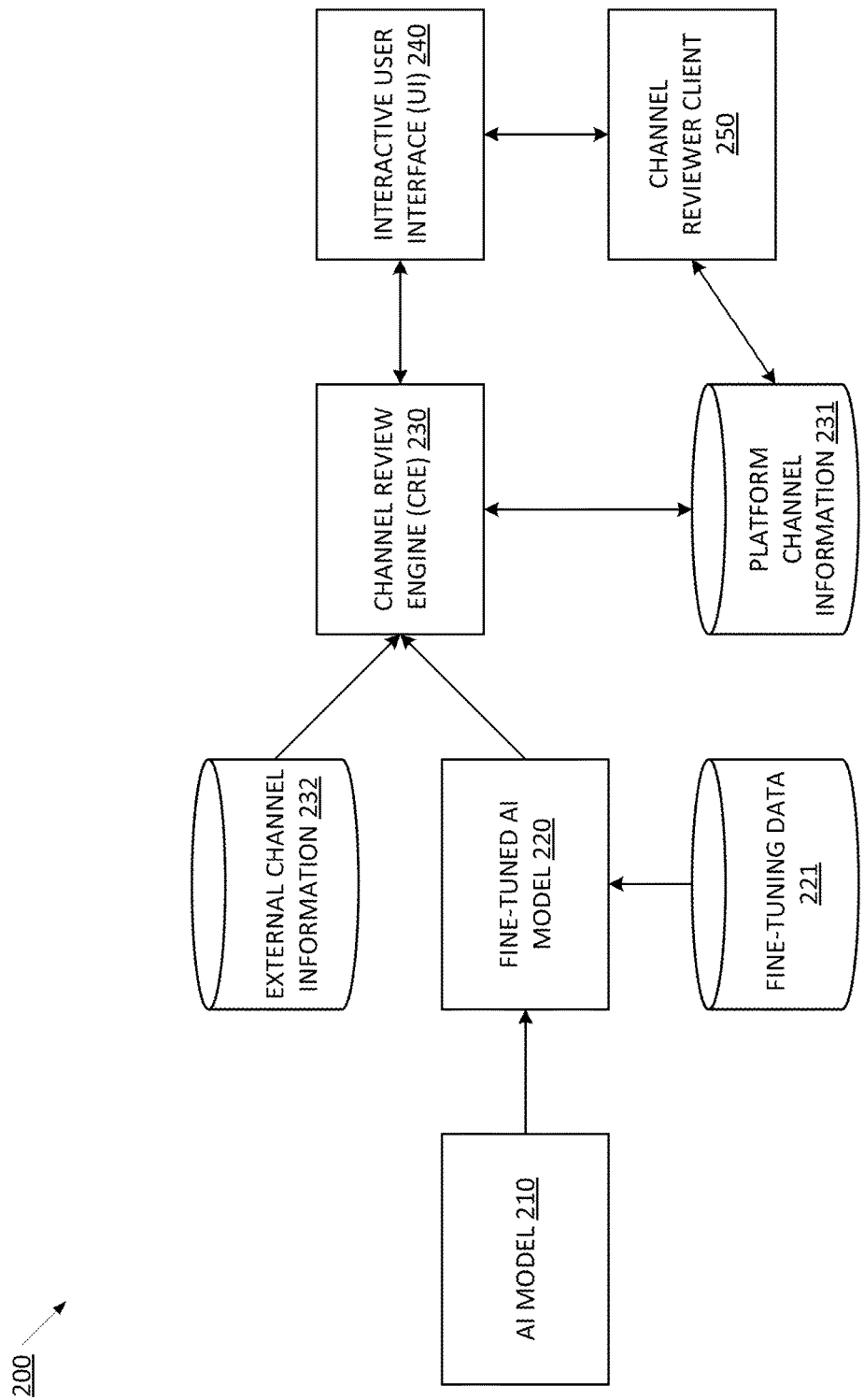
FIG. 2 depicts an example system utilizing a generative AI model to respond to requests from a channel reviewer client, in accordance with aspects of the present disclosure.

FIG. 2 depicts an example of system 200 that uses a generative AI model 210 to respond to requests from a channel reviewer client 250, in accordance with aspects of the present disclosure. Generative AI model 210 can be a generic generative AI model, such as a generic large language model (LLM). A generic generative AI model (e.g., generative AI model 210) can be fine-tuned to perform substantially the same as a purpose-trained custom generative AI model, albeit at a much lower cost and reduced complexity. In some implementations, the generative AI model 210 can be purpose trained and built for aspects of the present disclosure.

A fine-tuned AI model 220 can be the result of fine-tuning the generative AI model 210, using fine-tuning data 221. Fine-tuning data 221 can be based on the types of information that channel reviewing users will use to generate channel labels for the channel. For example, in a supervised fine-tuning training operation, fine-tuning data 221 inputs can include metadata about the channel (e.g., channel title, description, content item titles, content item transcripts, etc.) and fine-tuning data 221 target outputs can include corresponding summaries of the metadata, generated by channel reviewing users in previous channel review sessions. In some implementations, fine-tuning data 221 can include common questions that a channel reviewing user might ask, as well as corresponding responses. For example, a common question posed by a channel reviewing user can include, "What is this channel about?" for which a corresponding response might be, "This channel is about dinosaurs." The fine-tuning data 221 can be obtained in part (as previously noted) from historical channel review sessions. In some implementations, fine-tuning data 221 can have one or more tags associated with the training data.

Fine-tuning data 221 can be used to further train a fine-tuned AI model 220. That is, fine-tuning data 221 can be used to fine-tune the generative AI model 210 to create fine-tuned AI model 220, and can further be used to refine the fine-tuned AI model 220. Fine-tuning data 221 can be obtained as historical data from previous channel review sessions.

Channel review engine (CRE) 230 can use a generative AI model (e.g., fine-tuned AI model 220) to generate responses to questions submitted by a channel reviewing user through the interactive UI 240 of a channel reviewer client 250. CRE 230 can be the CRE 160 as described with reference to FIG. 1, and interactive UI 240 can be the interactive UI 125 as described with reference to FIG. 1. At the direction of the channel reviewing user, CRE 230 can use input from the channel reviewing user, the platform channel information 231, and/or external channel information 232 to generate responses to input from the channel reviewer client 250. In some implementations, CRE 230 can use the fine-tuned AI model 220, or additional AI models to obtain platform channel information 231. For example, CRE 230 can use an AI model to obtain platform channel information 231 from a channel, and use the output of the AI model as input to the fine-tuned AI model 220 to generate a response (e.g., a response 165 as described with reference to FIG. 1) to a channel reviewing user question (e.g., a question 161 as described with reference to FIG. 1). In some implementations, fine-tuned AI model 220 can perform both of the above functions. In some implementations, CRE 230 can include a discriminative AI model, or a predictive AI model to assist in obtaining the platform channel information 231, and/or assist in generating a response for a channel reviewing user. For example, the output of fine-tuned AI model 220 (e.g., the response to the channel reviewing user) can be used as input to a predictive AI model trained to predict channel labels for a given input. That is, the predictive AI model could be used by CRE 230 to generate preliminary channel labels for the channel reviewing user to consider. In some implementations, the predictive AI model and/or discriminative AI model can be used by CRE 230 to further train the fine-tuned AI model 220, such as in a GAN-style training methodology as previously described. In some implementations the CRE 230 can include an AI model trained to obtain external channel information 232 from external sources. In some implementations, fine-tuned AI model 220 can be trained to obtain external channel information 232 from external sources (e.g., external sources 113 as described with reference to FIG. 1).

Interactive UI 240 can enable a channel reviewing user to request information about channels and receive responses from the CRE 230. Interactive UI 240 can be an interactive UI 125 as described with reference to FIG. 1. Interactive UI 240 can identify a channel of the platform that is being reviewed, information about the channel obtained from the platform (e.g., platform channel information 231), portions of content items of the channel, platform polices, and include a location for the channel reviewing user to invoke a virtual assistant (VA), and an option to obtain external channel information 232 from a third party source (e.g., third-party platform). Interactive UI 240 can be displayed to a channel reviewing user through channel reviewer client 250. Additional details regarding the interactive UI 240 are described below with reference to FIG. 3.

Figure 3:
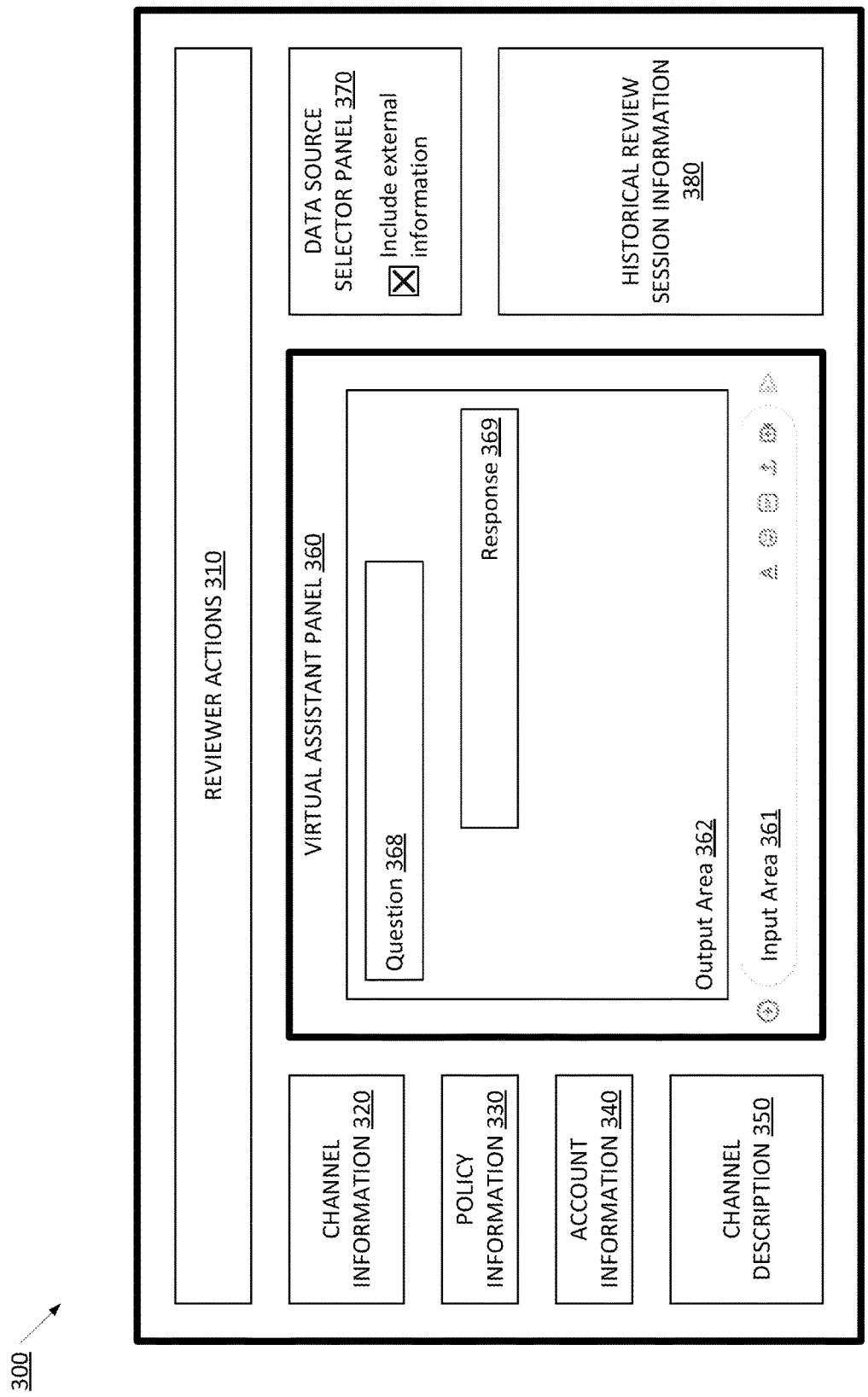
FIG. 3 depicts an example channel review user interface (UI) to be displayed on a client device for a channel reviewing user, in accordance with aspects of the present disclosure.

FIG. 3 depicts an example of a channel review user interface (UI) 300 to be displayed on a client device for a channel reviewing user, in accordance with aspects of the present disclosure. Channel review UI 300 includes information panels that can be interactive or static (e.g., read-only). Channel review UI 300 present the reviewer actions 310, channel information 320, policy information 330, account information 340, channel description 350, virtual assistant panel 360, data source selector panel 370, and historical review session information 380. The above list of information panels is not exhaustive, and while not shown in the illustrated example, additional information panels can be included in other implementations of channel review UI 300.

Reviewer actions 310 can include navigational items, or additional tools available to a channel reviewing user. For example, reviewer actions 310 can include tabs for a dashboard, policy review, insights for the channel, videos of the channel, internal reviewer comments, playlists associated with the channel, etc. Reviewer actions 310 can also include a summary of actions performed during a given review session. The summary of actions can be presented to the channel reviewing user alongside an option for the channel reviewing user to submit a review (e.g., terminate the human component of the channel review). Additional channel review tools can be included in reviewer actions 310, such as navigational tools, translation tools, sharing tools, etc.

Channel information 320 can include overview information about the channel being reviewed. Examples of overview information that can be included in the channel information 320 panel include an image associated with the channel (e.g., a channel profile image), the name of the channel, an age rating for the channel, a language of the channel, the number of channel subscribers, a contact email for the channel owner, a channel segment (e.g., related to how long the channel has existed, the size of the channel, etc.), a channel status (e.g., active, deactivated, pending review, etc.), a channel start date, and a visibility (e.g., public, private, delisted, etc.).

Policy information 330 can include scores or indicators for the channel based on various platform policies. For example, policy information 330 can indicate a number of times that the channel has violated a platform policy, or has been reported as violating a platform policy. Policy information can also display ranking metrics or scores for the channel that indicate how well the channel complies with various policies of the platform.

Account information 340 can include information about the account that owns the channel. Account information 340 and channel information 320 can include similar and/or overlapping information. The main distinction between account information 340 and channel information 320 being that one account can own multiple channels. For example, a single account can own a channel that publishes content in English, and simultaneously own a channel that publishes content in French. The channel information 320 for the English channel might indicate "English" as the publication language, while the channel information 320 for the French channel might indicate "French" as the publication language. The account information 340 can reflect the primary language used by the account owner, that is, either English or French. In some implementations, the account information 340 might reflect a "multiple languages."

Account information 340 can include the information presented in channel information 320 (or similar) and can additionally include more specific details such as an account creation date, an account creation location, an account current location (e.g., business location), a recent activity date of the account (e.g., the last time account was used by the account owner), a language of the account, an account image of the account (e.g., a user profile image), and policy scores associated with the account. Policy information 330 can primarily pertain to the policy standing of the channel, while a policy score displayed in the account information can indicate a policy standing of the account owning the channel. In some implementations where the account includes only one channel, the policy scores of the channel can be the same as the policy scores of the account. In some implementations, policy scores of the channel can affect the policy score of the account, however, policy scores of the account might not similarly affect the policy score of the channel.

Channel description 350 can display a channel description provided by the account owner for the channel.

Virtual assistant panel 360 can include input box 361 and output box 362. Virtual assistant panel 360 can provide a visual representation of a virtual assistant (VA) that can aid the channel reviewing user perform the human portions of a channel review. In some implementations, virtual assistant panel 360 can include a digital representation of a VA (e.g., an animation, static image, avatar, video, etc.). A channel reviewing user that uses channel review UI 300 can provide input for the virtual assistant (e.g., questions or other commands) via input box 361. In the illustrated example, input box 361 is illustrated as accepting text, formatted text, emojis, images, files, and videos. In some implementations, the input box 361 can accept a "free form" input. A free form input refers to an input that allows the channel reviewing user to provide open-ended and unstructured written answers. A free form input is not limited to predefined choices or formats, and the channel reviewing user has the freedom to express their thoughts or questions using their own words. A free form input does not have a correct answer or convention, although improperly formatted inputs might not produce desirable outputs. For example, incorrect spelling and grammar in a free form text input might impede the ability of a generative AI model to generate a response 369 that the channel reviewing user finds useful. In other implementations, input box 361 can accept additional forms of input.

In the illustrated example, the channel reviewing user has input text into the input box 361 in the form of question 368. Output box 362 displays the channel reviewing user input as question 368. After receiving question 368 (e.g., the input of the channel reviewing user), the VA can provide the question 368 to a generative AI model which can generate response 369. In some implementations, the VA includes the generative AI model. In some implementations, the VA is an intermediary between the channel reviewing user and one or more AI models trained to obtain channel information, generate responses based on input from the channel reviewing user, and perform additional tasks to reduce repetitive and/or tedious actions performed by the channel reviewing user. For example, as described above with reference to FIG.

1 and FIG. 2, the VA can include or interface with a generative AI model trained to generate responses to questions, one or more AI models trained to obtain channel information from the platform and/or external sources (e.g., external information), and/or an AI model trained to predict or determine channel labels that might apply to the channel.

In some implementations, question 368 can be prepopulated by the VA, and may not reflect input received from the channel reviewing user at input box 361. For example, when the channel reviewing user starts a review session of a channel, basic channel information can be automatically provided by the VA as input to one or more AI models. In such examples, the provided input can be displayed as question 368. In a specific example, prepopulated questions 368 that might be automatically provided by the VA can include, "What is this channel about?," "What are the titles of the last five videos published to this channel?," "What is the viewer interaction score for this channel?," "What are the most common subjects or themes of videos on this channel?," "Are videos published to this channel kid-friendly?," "Are advertisements displayed with videos of this channel?," "Do videos of this channel include profanity?," etc. These prepopulated questions can be configurations of the VA based on common information used by channel reviewing users to determine channel labels for the channel. In some implementations, prepopulated questions can be configured by individual channel reviewing users. In some implementations, prepopulated questions can be configured based on the channel, or a group of related channels.

A channel reviewing user can provide various inputs via input box 361 to obtain information (e.g., responses 369) about the channel that can be used by the channel reviewing user to determine one or more channel labels for the channel. The one or more channel labels can be attached to channel information and can be used by a channel review algorithm to determine whether the channel complies with one or more policies of the content sharing platform. Using virtual assistant panel 360, a channel reviewing user can engage the VA in a "conversation" about the channel. The VA can use previous inputs provided by the channel reviewing user when providing responses 369, similar to how humans in a conversation can base future responses in a conversation based on previous communications in the conversation. For example, the VA can use the question 368 as an input to one or more generative AI models to generate response 369.

Data source selector panel 370 can include a UI element to indicate to the VA that external information should be considered when generating responses 369. In the illustrated example, data sources selector panel 370 includes a checkbox labeled "Include external information." In the illustrated example, the checkbox is selected, which indicates to the VA that external channel information should be obtained from external sources. If there is no indication provided by the channel reviewing user to obtain information from external sources (e.g., external sources 113 as described with reference to FIG. 1), the VA obtains channel information from the content sharing platform, and thus generates responses 369 based on channel information obtained from the content sharing platform. That is, by default, the VA obtains channel information exclusively from the content sharing platform, and only obtains channel information from external sources at the indication of the channel reviewing user through data source selector panel 370. After the channel reviewing user has indicated that external information should be included in the data source selector panel 370, the VA can obtain channel information from external sources and generate responses 369 additionally based on channel information obtained from external sources.

In some implementations, the action by the channel reviewing user to indicate that channel information should be obtained from external sources can be a permanent action for the remainder of the channel review session. For example, if the channel reviewing user indicates in the data source selector panel 370 to include external information, the VA will continue to obtain and use external information from external sources for the remainder of the channel review session. In some implementations, the action by the channel reviewing user to indicate that the channel information should be obtained from external sources can be a semi-permanent action. For example, if the channel reviewing user indicates in the data source selector panel 370 to include external information and then inputs a question 368, the generated response 369 can be based on external information. If the channel reviewing user then indicates in the data source selector panel 370 to not include external information, a subsequent question that is different from question 368 will not be based on new external information, but might be based on external information already obtained to answer the question 368. In some implementations, the action by the channel reviewing user to indicate that channel information should be obtained from external sources can be non-permanent. For example, if the channel reviewing user indicates in the data source selector panel 370 to include external information and then inputs a question 368, the generated response 369 can be based on external information. If the channel reviewing user then indicates in the data source selector panel 370 to not include external information, external information obtained to generate the response to question 368 can be purged. Thus, if question 368 is provided after the data source selector has been toggled to not include external information, the generated response 369 can be based only on channel information obtained from the content sharing platform.

External channel information can be used to verify channel information obtained from the content sharing platform. For example, channel information obtained from the content sharing platform can indicate that a channel is about dinosaurs. However, external information obtained from an external source (e.g., external source 113 as described with reference to FIG. 1) can indicate that the channel is a non-scientific parody about dinosaurs. The channel information obtained from the content sharing platform might not indicate that the channel presents non-scientific information as a parody. Thus, in this example, without channel information from an external source, a channel reviewing user might incorrectly identify the channel as providing scientifically accurate information about dinosaurs. That is, the external information can provide verification (e.g., in this example in the form of additional information) to the channel information obtained from the content sharing platform.

External channel information can be obtained to verify the authenticity of the channel, the channel owner, or content items published to the channel. In some implementations, external channel information can be obtained to verify the reputation of a channel or channel owner. For example, a malicious actor might gain access to a channel and change settings of the channel (including adding or removing content items) such that the channel no longer resembles the channel that was maintained by channel owner. In such an example, channel information obtained from the content sharing platform might indicate that the channel is about a topic "A." However, external information obtained about the channel can indicate that the channel is about a topic "B." The discrepancy between topic "A," as supported by channel information obtained from the content sharing platform and topic "B" as supported by channel information obtained from external sources can provide valuable information to the channel reviewing user, which can be used by the channel reviewing user to generate appropriate channel labels for the channel.

Historical review session information 380 can include information from previous review sessions of the channel, and/or historical policy compliance channel information. In some implementations, portions of historical review session information 380 can be used by the VA as a part of input to the generative AI model used to generate the response 369.

Figure 4:
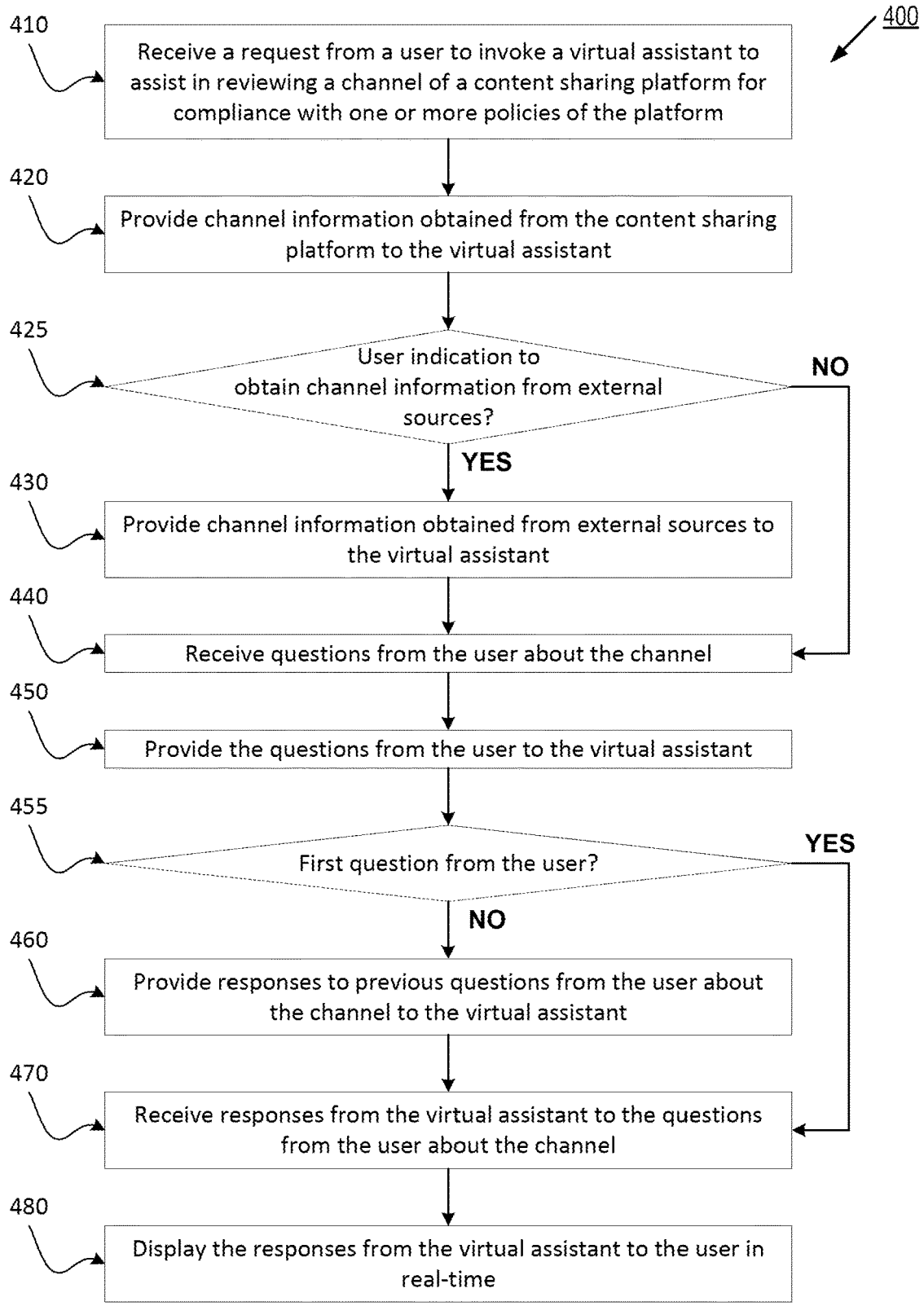
FIG. 4 depicts a flow diagram of an example method for a content sharing platform channel review using a virtual assistant, in accordance with aspects of the present disclosure.

FIG. 4 depicts a flow diagram of an example of the method 400 for a content sharing platform channel review using a virtual assistant, in accordance with aspects of the present disclosure. Method 400 can be performed by processing logic that can include hardware (circuitry, dedicated logic, etc.), software (e.g., instructions run on a processing device), or a combination thereof. In one implementation, some, or all of the operations of method 400 can be performed by one or more components of system 100 of FIG. 1. In some implementations, some, or all of the operations of method 400 can be performed by CRE 160 as described above.

At operation 410, processing logic performing the method 400 (e.g., CRE 160) receives a request from a user to invoke a virtual assistant (VA) to assist in reviewing a channel of a content sharing platform for compliance with one or more policies of the platform. In some implementations, the VA can automatically be invoked once a review session for a channel has commenced. In some implementations the channel reviewing user can invoke the VA by providing an input to a VA panel of an interactive UI on a reviewer client device (e.g., as described with reference to FIG. 1).

At operation 420, processing logic provides channel information obtained from the content sharing platform to the virtual assistant. As described above, one or more artificial intelligence models (AI models) can obtain the channel information from the content sharing platform. In some implementations, AI models that obtain channel information can be distinct from the generative AI model used to generate a response to an input from the channel reviewing user.

At operation 425, processing logic determines whether the user has indicated to obtain channel information from external sources. As described above, one or more artificial intelligence models (AI models) can obtain the channel information from the content sharing platform. In some implementations, AI models that obtain channel information can be distinct from the generative AI model used to generate a response to an input from the channel reviewing user. If the user has indicated that channel information should be obtained from external sources (e.g., "YES"), then processing logic can proceed to operation 430. If the user has not indicated that channel information should be obtained from external sources (e.g., "NO"), then proceed to operation 440.

At operation 430, responsive to determining that the user has indicated to obtain channel information from external sources (e.g., "YES"), processing logic provides channel information obtained from external sources to the virtual assistant. In some implementations, channel information can be obtained from external sources and held in reserve (e.g., obtained and stored separate from channel information obtained from the content sharing platform) until the channel reviewing user indicates that external information should be considered. In some implementations, channel information is only obtained from external sources after the channel reviewing user has indicated that channel information should be obtained from external sources (e.g., through data source selector panel 370 described with reference to FIG. 3).

At operation 440, processing logic receives questions from the user about the channel. The user (e.g., the channel reviewing user) can converse with the VA through a VA panel in the interactive user interface (as described with reference to FIG. 3). Questions (and other inputs from the channel reviewing user) can be displayed alongside responses provided by the VA in the interactive user interface.

At operation 450, processing logic provides the questions from the user to the virtual assistant. In some implementations the VA can include a generative AI model trained to respond to user questions based on channel information about the channel. In some implementations, the VA can merely provide an interface for the channel reviewing user to interact with the generative AI model.

At operation 455, processing logic determines whether the received question is a first question from the user. If the question is a first question from the channel reviewing user, there are no previous questions or inputs from the channel reviewing user that should be considered when responding to the current question. If the question is a first question (e.g., "YES"), processing logic can proceed to operation 470. If the question is not a first question (e.g., "NO"), processing logic can proceed to operation 460.

At operation 460, responsive to determining that the question is not a first question from the user (e.g., "NO"), processing logic provides responses to previous questions from the user about the channel to the virtual assistant. Because conversations between humans can be based on information shared during the conversation, the VA can similarly base future responses on previous inputs (e.g., questions) from the channel reviewing user and/or previously generated responses provided by the VA to the channel reviewing user. In this way, the VA can simulate a conversation interaction with the channel reviewing user.

At operation 470, processing logic receives responses from the virtual assistant to the questions from the user about the channel. As described with respect to operations 410 and 420, the VA can include, and/or interface with a generative AI model trained to provide responses to user input. The VA can receive outputs from the generative AI model and provide the outputs of the generative AI model as responses to the channel reviewing user. In some implementations, the VA (and/or processing logic) can modify outputs from the generative AI model before proceeding to operation 480. In some implementations, the VA (and/or processing logic) can extract responses to the input of the channel reviewing user from the output of the generative AI model. That is, the output of the generative AI model can include the response and additional information.

At operation 480, processing logic displays the responses from the virtual assistant to the user in real-time. "In real-time" can refer to an instantaneous, or near instantaneous and continuous processing and delivery of information as it is generated and/or received. Real-time processing can generally have a relatively minimal delay (e.g., less than 10 milliseconds) between an action and a response to the action. In some implementations, the complexity of the input action, latency of a network, latency of a computer system, and/or other uncontrollable interactions can negatively impact the length of the delay (e.g., up to less than 100 milliseconds, and/or less than 1 second). It should be noted that while most responses can be generated with relatively minimal delay, responses that are generated after a longer delay period are also considered. In a human to human conversation, there can often be gaps in the conversation when one human or the other takes a moment to gather their thoughts and respond. Thus it will be appreciated that longer delay periods can still allow the VA to simulate a conversational communication with the channel reviewing user.

Figure 5:
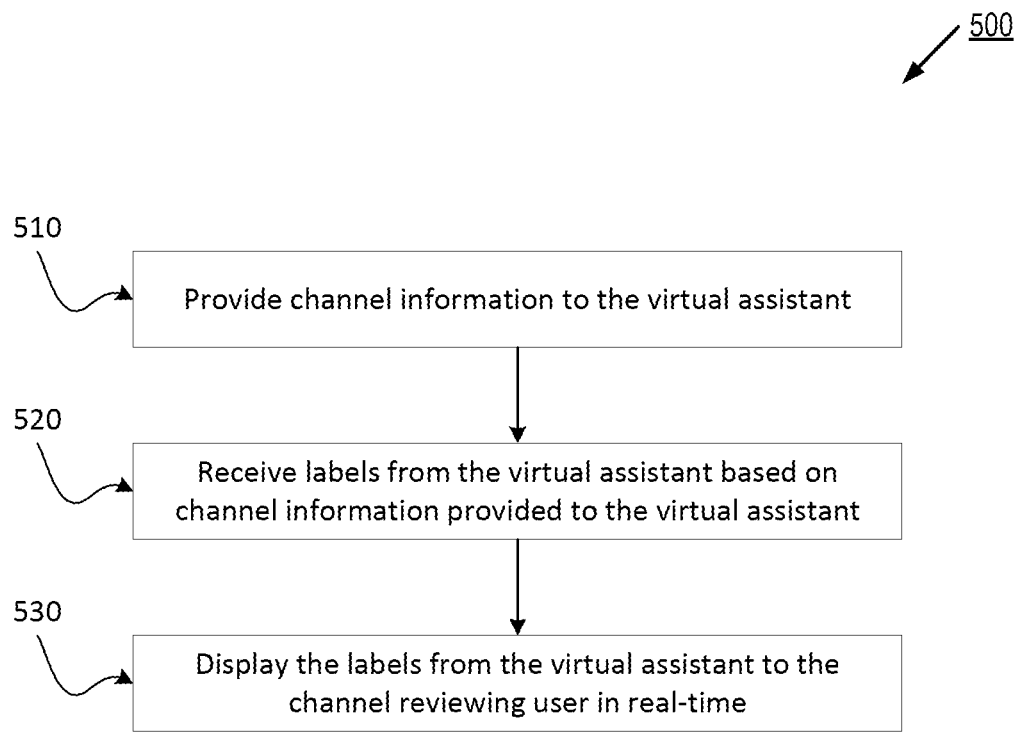
FIG. 5 depicts a flow diagram of an example method for a content sharing platform channel review using a virtual assistant, in accordance with aspects of the present disclosure.

FIG. 5 depicts a flow diagram of an example of the method 500 for a content sharing platform channel review using a virtual assistant, in accordance with aspects of the present disclosure. Method 500 can be performed by processing logic that can include hardware (circuitry, dedicated logic, etc.), software (e.g., instructions run on a processing device), or a combination thereof. In one implementation, some, or all of the operations of method 500 can be performed by one or more components of system 100 of FIG. 1. In some implementations, some, or all of the operations of method 500 can be performed by CRE 160 as described above.

At operation 510, processing logic performing the method 500 (e.g., CRE 160) provides channel information to the virtual assistant (VA). As described with reference to FIG. 1, FIG. 3, and FIG. 4, channel information can be obtained from the content sharing platform and/or from external sources based on configurations of the virtual assistant and actions performed by the channel reviewing user.

At operation 520, processing logic receives channel labels from the virtual assistant based on channel information provided to the virtual assistant. In some implementations, the VA can obtain channel label outputs from an AI model that is trained to generate channel labels in response to input from the channel reviewing user. These channel labels can be generated by a generative AI model, a predictive AI model, or a discriminative AI model. In some implementations, channel labels can be selected by the VA based on an output of the generative AI model trained to respond to inputs from the channel reviewing user.

At operation 530, processing logic displays the channel labels from the virtual assistant to the user in real-time. The VA can display the channel labels to the channel reviewing user and solicit confirmation from the channel reviewing user that the generated channel labels correspond to the channel under review. In some implementations, if the channel reviewing user indicates that the generated channel label corresponds to the channel under review, processing logic can assign the channel label to the channel, and indicate the assignment to the channel reviewing user via the interactive UI of a channel reviewer client.

Figure 6:
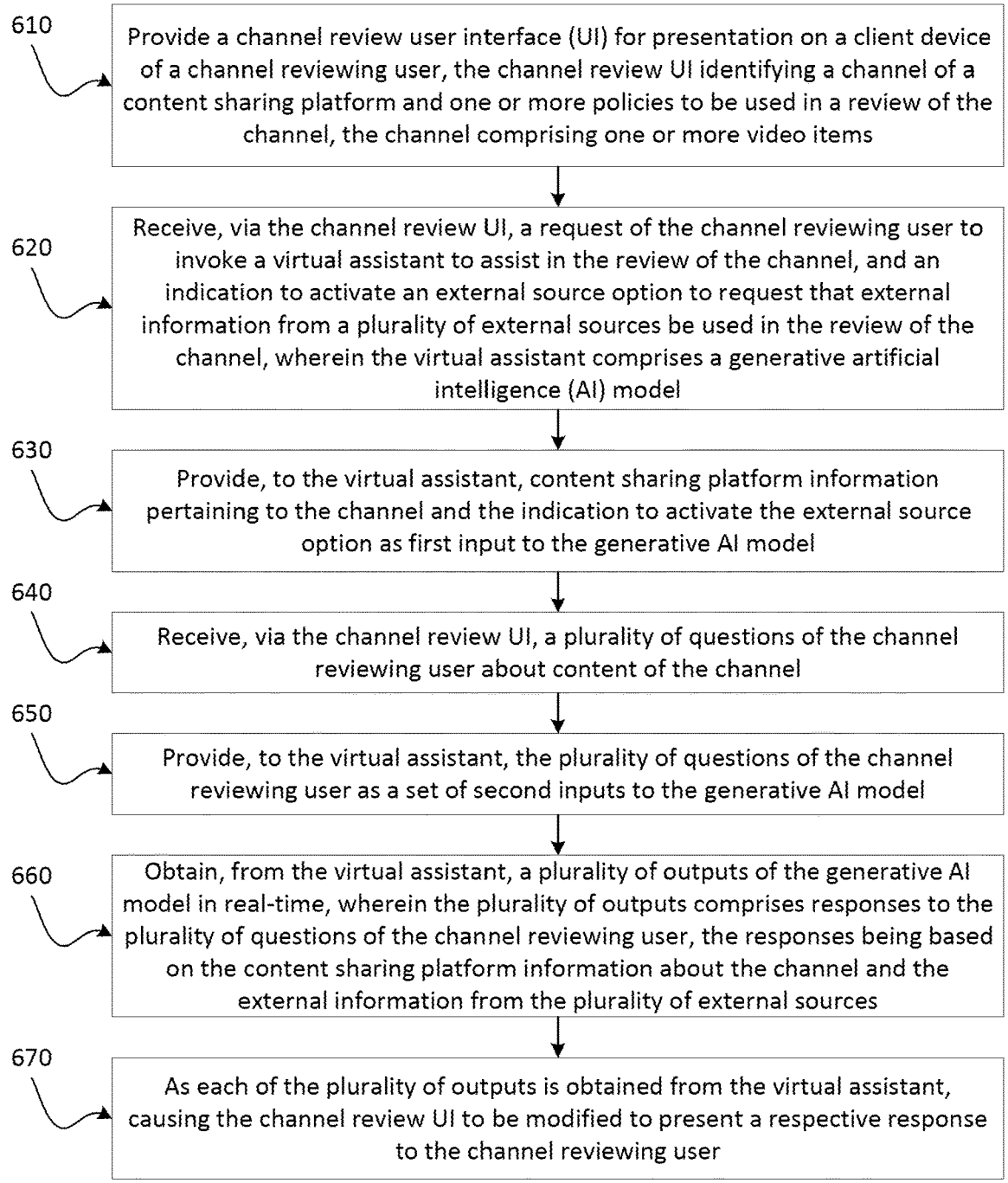
FIG. 6 depicts a flow diagram of an example method for a content sharing platform channel review using a virtual assistant, in accordance with aspects of the present disclosure.

FIG. 6 depicts a flow diagram of an example of the method 600 for a content sharing platform channel review using a virtual assistant, in accordance with aspects of the present disclosure. Method 600 can be performed by processing logic that can include hardware (circuitry, dedicated logic, etc.), software (e.g., instructions run on a processing device), or a combination thereof. In one implementation, some, or all of the operations of method 600 can be performed by one or more components of system 100 of FIG. 1. In some implementations, some, or all of the operations of method 600 can be performed by CRE 160 as described above.

At operation 610, processing logic performing the method 600 (e.g., CRE 160) provides a channel review user interface (UI) for presentation on a client device of a channel reviewing user. The channel review UI can identify a channel of a content sharing platform and one or more policies to be used in a review of the channel. The channel can include one or more video items.

At operation 620, processing logic receive, via the channel review UI, a request of the channel reviewing user to invoke a virtual assistant to assist in the review of the channel, and an indication to activate an external source option to request that external information from external sources be used in the review of the channel. The virtual assistant can include a generative artificial intelligence (AI) model. In some implementations after the virtual assistant is invoked, the virtual assistant panel can display a summary of information obtained about the channel. The summary of information can be based on channel information obtained from the content sharing platform and/or external information from external sources, depending on the configuration settings of the channel review UI adjusted by the channel reviewing user.

At operation 630, processing logic provides, to the virtual assistant, content sharing platform information pertaining to the channel and the indication to activate the external source option as first input to the generative AI model. In some implementations, the content sharing information can include metadata associated with the channel. In some implementations, metadata associated with the channel can include, for example, a channel title, a channel description, a channel source, a channel viewership statistic, a video item title, a video item description, a video item duration, a video item publication status, or a video item viewership statistic. The generative AI model can be trained to obtain external information from external sources in order to generate a response. In some implementations, one or more AI models trained to obtain channel information from the content sharing platform, and channel information from external sources can be distinct from the generative AI model trained to generate a response.

At operation 640, processing logic receives, via the channel review UI, questions of the channel reviewing user about content of the channel. In some implementations, the channel reviewing user can input multiple questions simultaneously. For example, the channel reviewing user might input the following, "What is the subject of the most recent five videos, and is the subject kid-friendly?" While only a single input phrase, this input phrase is a compound question. Such compound questions and strings of questions can be used as input.

At operation 650, processing logic provides, to the virtual assistant, a the questions of the channel reviewing user as a set of second inputs to the generative AI model. In some implementations, one or more questions of the plurality of questions of the channel reviewing user can be about content of the plurality of content items. In some implementations, one or more questions of the plurality of questions of the channel reviewing user can be regarding a reputation of the channel. In some implementations where processing logic receives more than one question of the channel reviewing user, processing logic can provide responses for previously received questions as a set of inputs to the generative AI model. In some implementations, processing logic can provide responses for previously received questions as a set of inputs to a second AI model. The second AI model can be trained to generate or predict channel labels for the channel based on channel information obtained from the content sharing platform and/or from external sources.

At operation 660, processing logic obtains, from the virtual assistant, outputs of the generative AI model in real-time. The outputs can include responses to the plurality of questions of the channel reviewing user, the responses being based on the content sharing platform information about the channel and the external information from the plurality of external sources. In some implementations, responses to the questions can indicate whether the channel complies with the one or more policies. In some implementations, responses to the questions can be based on external information obtained from the one or more external sources. In some implementations, the VA can provide one response that answers multiple questions. In some implementations, the VA can provide many responses to a single question.

In some implementations, the outputs of the generative AI model can also include one or more channel labels corresponding to the questions of the channel reviewing user, as described with reference to FIG. 5. The channel labels can be based on channel information obtained from the content sharing platform and/or external sources. The channel labels can indicate whether the channel complies with one or more polices of the content sharing platform. In some implementations, the channel labels can be used as part of an input to an algorithm to determine whether the channel complies with policies of the content sharing platform.

At operation 670, as each of the plurality of outputs is obtained from the virtual assistant, processing logic causes the channel review UI to be modified to present a respective response to the channel reviewing user.

In implementations including generated channel labels generated and/or predicted by the generative AI model or another AI model (e.g., a generative AI model, an inference/predictive AI model, a discriminative AI model, etc.), processing logic can cause the channel review UI to be modified to present respective channel labels to the channel reviewing user. The channel reviewing user can be requested to confirm whether the respective channel labels correspond to the channel. In some implementations, the respective channel labels can be selected (e.g., predicted) based on a predetermined list of channel labels. In some implementations, after processing logic receives a confirmation indication that a respective channel label corresponds to the channel of the content sharing platform, processing logic can assign the respective channel label to the channel. For example, channel labels can be assigned to channels by storing, in a data structure, an indication that the respective channel label corresponds to the channel. In some implementations, after a respective channel label has been assigned to a channel, processing logic can cause the channel review UI to be modified to indicate that the respective channel label has been assigned to the channel. The data structure can temporarily store the indication of the assignment. In some implementations, the channel label can be permanently assigned to the channel when the channel reviewing user terminates the review session (e.g., by submitting the channel labels to the channel review algorithm).

In some implementations, training data for additional training of the generative AI model can be selected from the questions of the channel reviewing users and responses to the questions of the channel reviewing user that can be generated by the generative AI model.

Figure 7:
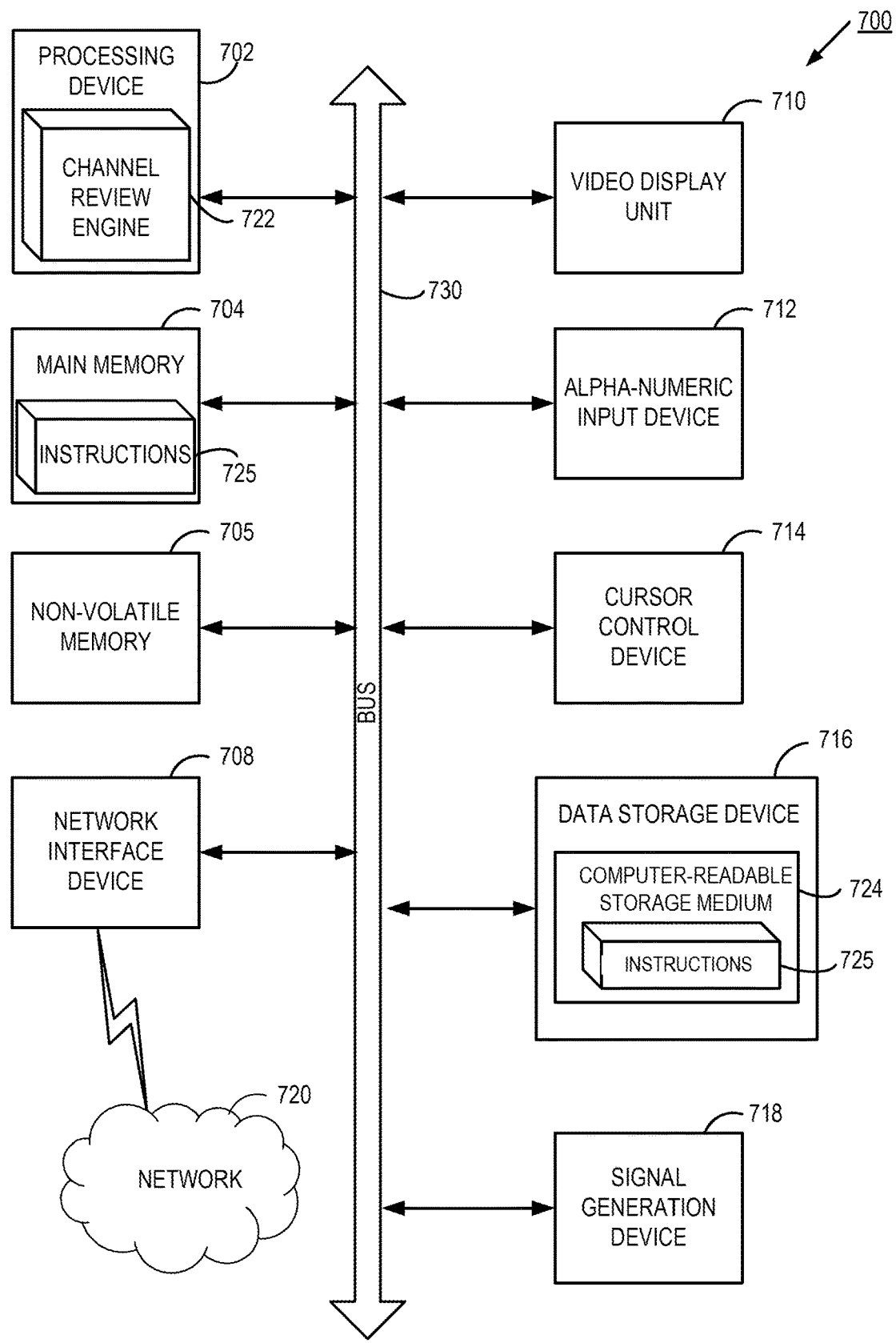
FIG. 7 is a block diagram illustrating an exemplary computer system, in accordance with implementations of the present disclosure.

FIG. 7 is a block diagram illustrating an example of the computer system 700, in accordance with aspects of the present disclosure. The computer system 700 can correspond to platform 120 and/or client devices 102A-N, described in FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702 (e.g., a processor), a main memory 704 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 705 (e.g., flash memory, static random access memory (SRAM), etc.), and a data storage device 716, which communicate with each other via a bus 730.

Processing device 702 represents one or more general-purpose processing devices such as a microprocessor, central processing unit, or the like. More specifically, processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute translation processing logic 722 (e.g., for providing authentication challenges to users) for performing the operations discussed herein. The processing device 702 can be configured to execute instructions 725 stored in main memory 704. Non-volatile memory 705 can store the instructions 725 when they are not being executed, and can store additional system data that can be accessed by processing device 702.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a computer-readable storage medium 724 (e.g., a non-transitory computer readable storage medium) on which is stored one or more sets of instructions 725 (e.g., for generating variations of a translated audio portion) embodying any one or more of the methodologies or functions described herein. The instructions can also reside, completely or at least partially, within the main memory 704 and/or within the processing device 702 during execution thereof by the computer system 700, the main memory 704 and the processing device 702 also constituting machine-readable storage media. The instructions can further be transmitted or received over a network 720 via the network interface device 708.

While the computer-readable storage medium 724 (machine-readable storage medium) is illustrated in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a specific feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the specific features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specific by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
providing a channel review user interface (UI) for presentation on a client device of a channel reviewing user, the channel review UI identifying a channel of a content sharing platform and one or more policies to be used in a review of the channel, the channel comprising one or more video items;
receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant comprises a generative artificial intelligence (AI) model;
providing, to the virtual assistant, content sharing platform information pertaining to the channel and the indication to activate the external source option as first input to the generative AI model;
receiving, via the channel review UI, a plurality of questions of the channel reviewing user about content of the channel;
providing, to the virtual assistant, the plurality of questions of the channel reviewing user as a set of second inputs to the generative AI model;
obtaining, from the virtual assistant, a plurality of outputs of the generative AI model in real-time, wherein the plurality of outputs comprises responses to the plurality of questions of the channel reviewing user, the responses being based on the content sharing platform information about the channel and the external information from the plurality of external sources; and as each of the plurality of outputs is obtained from the virtual assistant, causing the channel review UI to be modified to present a respective response to the channel reviewing user.

2. The method of claim 1, wherein one or more questions of the plurality of questions of the channel reviewing user pertain to content of the one or more video items, wherein responses to the one or more questions are based on external information obtained from the plurality of external sources.

3. The method of claim 1, wherein one or more questions of the plurality of questions of the channel reviewing user pertain to a reputation of the channel, wherein responses to the one or more questions are based on external information obtained from the plurality of external sources.

4. The method of claim 1, wherein responses to the plurality of questions indicate whether the channel is compliant with the one or more policies.

5. The method of claim 1, wherein the channel review UI comprises a virtual assistant panel for communications between the channel reviewing user and the virtual assistant.

6. The method of claim 5, wherein prior to receiving, via the channel review UI, a first question of the channel reviewing user pertaining to content of the channel, the virtual assistant panel displays a summary of information obtained about the channel, the summary based on the content sharing platform information about the channel and the external information from the plurality of external sources.

7. The method of claim 1, wherein the plurality of outputs further comprises one or more channel labels corresponding to the plurality of questions of the channel reviewing user, the one or more channel labels being based on the content sharing platform information pertaining to the channel and the external information from the plurality of external sources.

8. The method of claim 7, wherein the one or more channel labels indicate whether the channel is compliant with one or more policies.

9. The method of claim 1, further comprising:
providing, to the virtual assistant, responses to the plurality of questions of the channel reviewing user as a set of inputs to a second AI model; and
obtaining, from the virtual assistant, a second plurality of outputs of the second AI model in real-time, wherein the second plurality of outputs comprise channel labels corresponding to the plurality of questions of the channel reviewing user, the channel labels being based on the content sharing platform information pertaining to the channel and the external information from the plurality of external sources.

10. The method of claim 9 further comprising:
as each of the second plurality of outputs is obtained from the virtual assistant, causing the channel review UI to be modified to present a second respective response to the channel reviewing user, the second respective response indicating a respective channel label and requesting a confirmation that the respective channel label corresponds to the channel of the content sharing platform.

11. The method of claim 10, further comprising:
receiving a confirmation indication that the respective channel label corresponds to the channel of the content sharing platform; and
assigning the respective channel label to the channel of the content sharing platform by storing, in a data structure, an indication that the respective channel label corresponds to the channel of the content sharing platform.

12. The method of claim 11, further comprising:
causing the channel review UI to be modified to indicate the respective channel label has been assigned to the channel of the content sharing platform.

13. The method of claim 1, wherein the content sharing platform information is obtained based on metadata associated with the channel and one or more transcripts of the one or more video items.

14. The method of claim 1, further comprising:
providing, to the virtual assistant, the responses to the plurality of questions of the channel reviewing user as a set of third inputs to the generative AI model;
providing, to the virtual assistant, a second plurality of questions of the channel reviewing user as a set of fourth inputs to the generative AI model;
obtaining, from the virtual assistant, a second plurality of outputs of the generative AI model in real-time, wherein the second plurality of outputs comprises second responses to the second plurality of questions of the channel reviewing user, the second responses being based on the content sharing platform information about the channel and the external information from the plurality of external sources; and
as each of the second plurality of outputs is obtained from the virtual assistant, causing the channel review UI to be modified to present a second respective response to the channel reviewing user.

15. The method of claim 1, wherein training data for further training of the generative AI model is selected from the plurality of questions of the channel reviewing user and responses to the plurality of questions of the channel reviewing user.

16. The method of claim 1, wherein metadata associated with the channel comprises at least one of a channel title, a channel description, a channel source, a channel viewership statistic, a video item title, a video item description, a video item duration, a video item publication status, or a video item viewership statistic.

17. A system comprising:
a memory; and
a processor communicatively coupled to the memory, the processor to perform operations comprising:
providing a channel review user interface (UI) for presentation on a client device of a channel reviewing user, the channel review UI identifying a channel of a content sharing platform and one or more policies to be used in a review of the channel, the channel comprising one or more video items;
receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant comprises a generative artificial intelligence (AI) model;
providing, to the virtual assistant, content sharing platform information pertaining to the channel and the indication to activate the external source option as first input to the generative AI model;
receiving, via the channel review UI, a plurality of questions of the channel reviewing user about content of the channel;

providing, to the virtual assistant, the plurality of questions of the channel reviewing user as a set of second inputs to the generative AI model;

obtaining, from the virtual assistant, a plurality of outputs of the generative AI model in real-time, wherein the plurality of outputs comprises responses to the plurality of questions of the channel reviewing user, the responses being based on the content sharing platform information about the channel and the external information from the plurality of external sources, the responses indicating whether the channel is compliant with the one or more policies; and as each of the plurality of outputs is obtained from the virtual assistant, causing the channel review UI to be modified to present a respective response to the channel reviewing user.

18. The system of claim 17, wherein one or more first questions of the plurality of questions of the channel reviewing user pertain to content of the one or more video items, and one or more second questions of the plurality of questions of the channel reviewing user pertain to a reputation of the channel, wherein responses to the one or more first questions and the one or more second questions are based on external information obtained from the plurality of external sources.

19. The system of claim 17, wherein the channel review UI comprises a virtual assistant panel for communications between the channel reviewing user and the virtual assistant.

20. A non-transitory computer readable storage medium comprising instructions for a server that, when executed by a processing device, cause the processing device to perform operations comprising:

providing a channel review user interface (UI) for presentation on a client device of a channel reviewing user, the channel review UI identifying a channel of a content sharing platform and one or more policies to be used in a review of the channel, the channel comprising one or more video items;

receiving, via the channel review UI, a request of the channel reviewing user to invoke a virtual assistant to assist in the review of the channel, and an indication to activate an external source option to request that external information from a plurality of external sources be used in the review of the channel, wherein the virtual assistant comprises a generative artificial intelligence (AI) model;

providing, to the virtual assistant, content sharing platform information pertaining to the channel and the indication to activate the external source option as first input to the generative AI model;

receiving, via the channel review UI, a plurality of questions of the channel reviewing user about content of the channel;

providing, to the virtual assistant, the plurality of questions of the channel reviewing user as a set of second inputs to the generative AI model;

obtaining, from the virtual assistant, a plurality of outputs of the generative AI model in real-time, wherein the plurality of outputs comprises responses to the plurality of questions of the channel reviewing user, the responses being based on the content sharing platform information about the channel and the external information from the plurality of external sources; and as each of the plurality of outputs is obtained from the virtual assistant, causing the channel review UI to be modified to present a respective response to the channel reviewing user.

* * * * *